US012590979B2

(12) United States Patent
Deshpande et al.

(10) Patent No.: US 12,590,979 B2
(45) Date of Patent: Mar. 31, 2026

(54) ANALYZER HAVING AUTOMATIC TEST TYPE SENSING

(71) Applicant: Siemens Healthcare Diagnostics Inc., Tarrytown, NY (US)

(72) Inventors: Manish Deshpande, Newton, MA (US); Ethan Warner, North Attleboro, MA (US); Emma Orton, Cranston, RI (US)

(73) Assignee: Siemens Healthcare Diagnostics Inc., Tarrytown, NY (US)

( * ) Notice: Subject to any disclaimer, the term of this patent is extended or adjusted under 35 U.S.C. 154(b) by 41 days.

(21) Appl. No.: 18/555,880

(22) PCT Filed: Apr. 20, 2022

(86) PCT No.: PCT/US2022/071811
§ 371 (c)(1),
(2) Date: Oct. 18, 2023

(87) PCT Pub. No.: WO2022/226504
PCT Pub. Date: Oct. 27, 2022

(65) Prior Publication Data
US 2024/0201210 A1 Jun. 20, 2024

Related U.S. Application Data

(60) Provisional application No. 63/178,595, filed on Apr. 23, 2021.

(51) Int. Cl.
*G01N 35/00* (2006.01)
*G06K 19/07* (2006.01)

(52) U.S. Cl.
CPC . *G01N 35/00732* (2013.01); *G01N 35/00871* (2013.01); *G06K 19/0723* (2013.01); *G01N 2035/00742* (2013.01)

(58) Field of Classification Search
CPC ................................................. G01N 35/00732
(Continued)

(56) References Cited

U.S. PATENT DOCUMENTS

| | | | |
|---|---|---|---|
| 3,123,443 A | 3/1964 | Smeby et al. | |
| 3,212,855 A | 10/1965 | Mast et al. | |

(Continued)

FOREIGN PATENT DOCUMENTS

| | | |
|---|---|---|
| AU | 2016297652 A1 | 2/2018 |
| WO | 2020016616 A1 | 1/2020 |

OTHER PUBLICATIONS

International Search Report and Written Opinion of International Application No. PCT/US2022/071811 dated Jul. 1, 2022.

*Primary Examiner* — Daniel A Hess

(57) ABSTRACT

An automated analyzer is described. The analyzer includes a housing, a consumable insert, a consumable support device, a reader and a control system. The housing has a sample port. The consumable insert has a consumable insert type and an identification component and receives a consumable. The consumable support device is disposed within the sample port, supports the consumable insert, and is moveable to a testing position within the internal cavity. The consumable support device has an identifier component configured to identify the consumable insert type based in part on the identification component and configured to output a first data signal indicative of the consumable insert type. The reader outputs a second data signal indicative of a reading from the consumable. The control system receives the first and second data signals, and interprets the second data signal based on the first data signal.

17 Claims, 6 Drawing Sheets

(58) Field of Classification Search
USPC ......................................................... 235/375
See application file for complete search history.

(56)                    References Cited

U.S. PATENT DOCUMENTS

| | | | |
|---|---|---|---|
| 3,814,668 A | 6/1974 | Blake et al. | |
| 4,526,753 A | 7/1985 | Boger et al. | |
| 2001/0051377 A1* | 12/2001 | Hammer .......... | G01N 35/00029 |
| | | | 422/68.1 |
| 2006/0157549 A1* | 7/2006 | Stein ...................... | G16H 40/20 |
| | | | 235/375 |
| 2006/0283945 A1* | 12/2006 | Excoffier .............. | B01L 3/5457 |
| | | | 235/487 |
| 2007/0231209 A1* | 10/2007 | Cosentino ........ | G01N 33/48771 |
| | | | 422/68.1 |
| 2010/0188244 A1* | 7/2010 | Sattler ........................ | G09F 3/10 |
| | | | 235/494 |
| 2010/0267049 A1 | 10/2010 | Rutter et al. | |
| 2011/0111522 A1 | 5/2011 | Zimmerle et al. | |
| 2020/0124587 A1* | 4/2020 | Dechev ................ | G01N 21/255 |

* cited by examiner

ANALYZER HAVING AUTOMATIC TEST TYPE SENSING

This application claims benefit under 35 USC § 119(e) of U.S. Provisional Application No. 63/178,595, filed Apr. 23, 2021. The entire contents of the above-referenced patent application(s) are hereby expressly incorporated herein by reference.

BACKGROUND

The inventive concepts disclosed herein generally relate to analyzers for reagent cards, and more particularly, but not by way of limitation, to an analyzer having an improved consumable support device operable to receive a consumable insert configured to receive one or more consumable.

To satisfy the needs of the medical profession as well as other expanding technologies, such as the brewing industry, chemical manufacturing, etc., a myriad of analytical procedures, compositions, and tools have been developed, including lateral flow immunoassays, and the so-called "dip-and-read" type reagent test devices. Regardless of whether lateral flow immunoassays, or dip-and-read test devices are used for the analysis of a biological fluid or tissue, or for the analysis of a commercial or industrial fluid or substance, the general procedure involves a test device coming in contact with the sample or specimen to be tested, and manually or instrumentally analyzing the test device.

A lateral flow immunoassay is a diagnostic device used to confirm the presence or absence of a target analyte. Lateral flow immunoassays typically contain a flow path which conveys a sample past a control line position and a test line position. A control line at the control line position confirms the test is working properly, and a test line at the test line position provides the result of the lateral flow immunoassay. Lateral flow immunoassays are developed to be used in a dipstick format or in a housed test format. Both dipsticks and housed tests work in a similar way, and generally fall within one of two categories: sandwich assays—a positive test is represented by the presence of a colored line at the test line position; and competitive assays—a positive test is represented by the absence of a colored line at the test line position.

Dip-and-read reagent test devices enjoy wide use in many analytical applications, especially in the chemical analysis of biological fluids, because of their relatively low cost, ease of usability, and speed in obtaining results. In medicine, for example, numerous physiological functions can be monitored merely by dipping a dip-and-read reagent test device into a sample of body fluid or tissue, such as urine or blood, and observing a detectable response, such as a change in color or a change in the amount of light reflected from, or absorbed by the test device.

Many of the dip-and-read reagent test devices for detecting body fluid components are capable of making quantitative, or at least semi-quantitative, measurements. Thus, by measuring the detectable response after a predetermined time, a user can obtain not only a positive indication of the presence of a particular constituent in a test sample, but also an estimate of how much of the constituent is present. Such dip-and-read reagent test devices provide physicians and laboratory technicians with a facile diagnostic tool, as well as with the ability to gauge the extent of disease or bodily malfunction.

Illustrative of dip-and-read reagent test devices currently in use are products available from Siemens Healthcare Diagnostics Inc., under the trademark MULTISTIX, and others. Immunochemical, diagnostic, or serological test devices, such as these usually include one or more carrier matrix, such as absorbent paper, having incorporated therein a particular reagent or reactant system which manifests a detectable response (e.g., a color change in the visible or ultraviolet spectrum) in the presence of a specific test sample component or constituent. Depending on the reactant system incorporated with a particular matrix, these test devices can detect the presence of glucose, ketone bodies, bilirubin, urobilinogen, occult blood, nitrite, and other substances. A specific change in the intensity of color observed within a specific time range after contacting the dip-and-read reagent test device with a sample is indicative of the presence of a particular constituent and/or its concentration in the sample. Some other examples of dip-and-read reagent test devices and their reagent systems may be found in U.S. Pat. Nos. 3,123,443; 3,212,855; and 3,814,668, the entire disclosures of which are hereby incorporated herein by reference.

Testing tools and methods have been sought in the art for economically and rapidly conducting multiple tests, especially via using automated processing. Automated analyzer systems have an advantage over manual testing with respect to cost per test, test handling volumes, and/or speed of obtaining test results or other information.

Automated instruments which are currently available for instrumentally reading individual reagent test devices, such as lateral flow immunoassays, or dip-and-read reagent test devices, or reagent strips, (e.g., CLINITEK STATUS reflectance photometer, manufactured and sold by Siemens Healthcare Diagnostics, Inc.) require each test device to be manually loaded into the automated instrument after contacting the test device with specimen or sample to be tested. Manual loading requires that the reagent test device be properly positioned in the automated instrument within a limited period of time after contacting the solution or substance to be tested. Each of the individual reagent test devices may have a particular analysis corresponding to the particular reagent test device, a test type, a test speed, or the like. The technician may select the particular analysis from a list of analyses on the automated instrument. At the end of the analysis, used reagent test devices are removed from the instrument and disposed of in accordance with applicable laws and regulations.

Another development is the introduction of multiple-profile reagent cards and multiple-profile reagent card automated analyzers. Multiple-profile reagent cards are essentially card-shaped test devices which include multiple reagent-impregnated matrices or pads for simultaneously or sequentially performing multiple analyses of analytes, such as the one described in U.S. Pat. No. 4,526,753, for example, the entire disclosure of which is hereby incorporated herein by reference. The reagent pads on the multiple-profile reagent card are typically arranged in a grid-like arrangement and spaced at a distance from one another so as to define several rows and columns of reagent pads. Adjacent reagent pads in the same row may be referred to as a test strip, and may include reagents for a preset combination of tests that is ran for each sample, for example.

Multiple-profile reagent cards result in an efficient, economical, rapid, and convenient way of performing automated analyses. An automated analyzer configured to use multiple-profile reagent cards typically takes a multiple-profile reagent card, such as from a storage drawer, or a cassette, and advances the multiple-profile reagent card through the analyzer over a travelling surface via a card moving mechanism, typically one step at a time so that one test strip (or one row of reagent pads) is positioned at a sample-dispensing position and/or at one or more read position. Each multiple-profile reagent card may have a particular analysis corresponding to the particular multiple-profile reagent cards. The technician may select the particular analysis from a list of analyses on the automated instrument to perform on each multiple-profile reagent card.

Exemplary card moving mechanisms include a conveyor belt, a ratchet mechanism, a sliding ramp, or a card-gripping or pulling mechanism. As the multiple-profile reagent card is moved or travels along the travelling surface and is positioned at the sample-dispensing position, one or more pipettes (e.g., manual or automatic) deposits a volume of one or more samples on one or more of the reagent pads on the reagent card. Next, the reagent pads are positioned at one or more read positions and analyzed (e.g., manually or automatically) to gauge the test result.

The reagent card is placed in the field of view of an imaging system, such as an optical imaging system, a microscope, or a photo spectrometer, for example, and one or more images of the reagent pads on the card (e.g., optical signals indicative of the color of the reagent pads) is captured and analyzed. Typically, the field of view of the imaging system is relatively large to allow for the capture of multiple images of the same reagent pad as the reagent card is moved or stepped across multiple read positions in the field of view of the imaging system. The field of view encompasses multiple read positions or locations, and each reagent pad is moved in a stepwise fashion through the read positions as the reagent card travels across the field of view of the imaging system.

Because the analyzer moves the card between various read positions in known intervals of time, the multiple images taken in the field of view of the imaging system allow the analyzer to determine changes in the color of the reagent pad as a result of the reagent pad reacting with the sample at each read position as a function of the time it takes the pad to be moved to the respective read position, for example. Finally, the used card is removed from the analyzer, and is disposed of appropriately.

As described above, each of the individual reagent test devices and/or multiple-profile reagent card may have a particular analysis corresponding to the particular reagent test device or multiple-profile reagent card. In order to correctly identify the particular analysis required for each of the individual reagent test devices and/or multiple-profile reagent card, the technician is required to correctly identify the particular analysis that is needed. When the particular analysis is correctly identified, the automated instrument may perform the particular analysis and initiate customer feedback, e.g., instructions, to correctly operate a test workflow for the particular analysis.

Additionally, the automated instrument may include a broad test menu including a plurality of analyses from which the technician must select the particular analysis; however, the automated instrument is not able to limit the broad test menu to only a set of analyses that can be performed for a particular consumable insert.

Currently, the user must select the particular analysis, e.g., hCG, urine strip, etc., to trigger the correct test workflow. Existing problems with having the technician select the particular analysis to be performed include at least improper selection of the analysis to be performed by the automated instrument, thus triggering the wrong test and wrong test workflow, and increased duration of time for performing the analysis as the technician has to search the broad test menu for the appropriate analysis. Further, if the selected test and the reagent test device do not match, the test will be canceled resulting in a lost sample.

Accordingly, a need exists in the art for an automated instrument that limits or reduces the occurrence of improper selection of the analysis to be performed by the automated instrument, thereby causing the automated instrument to trigger the correct analysis and the correct test workflow, and that decreases the duration of time for performing the analysis.

SUMMARY

It is to such improvements that the present disclosure is directed. The problems associated with the technician selecting the particular analysis to be performed are solved by an automated analyzer provided with a housing, a consumable insert, a consumable support device, a reader and a control system. The housing has at least one outer wall that defines an internal cavity therein. The housing has a sample port. The consumable insert has a consumable insert type and an identification component and is operable to receive at least one consumable. The consumable support device is disposed within the sample port and is operable to support the consumable insert and is moveable to a testing position within the internal cavity and a receiving position outside the internal cavity via the sample port. The consumable support device has an identifier component configured to identify the consumable insert type based in part on the identification component and is configured to output a first data signal indicative of the consumable insert type. The reader is disposed within the housing and is adjacent to the testing position. The reader is configured to output a second data signal indicative of a reading from the at least one consumable. The control system is configured to receive the first data signal and the second data signal, and to interpret the second data signal based on the first data signal.

In another aspect of the disclosure, the problems associated with the technician selecting the particular analysis to be performed are solved by a method of using an automated analyzer comprising: inserting a consumable into a consumable port of a consumable insert, the consumable being an analysis device having a specimen for analysis and having a consumable type, and the consumable insert operable to support the consumable. The consumable insert is placed with a particular orientation into a consumable support device. Then, an analysis workflow may be initiated for the consumable device to cause the automated analyzer to analyze the specimen without requiring manual selection of the analysis workflow.

BRIEF DESCRIPTION OF THE DRAWINGS

To assist those of ordinary skill in the relevant art in making and using the inventive concepts disclosed herein, reference is made to the appended drawings and schematics, which are not intended to be drawn to scale, and in which like reference numerals are intended to refer to the same or similar elements for consistency. For purposes of clarity, not every component may be labeled in every drawing. Certain features and certain views of the figures may be shown exaggerated and not to scale or in schematic in the interest of clarity and conciseness. In the drawings.

DETAILED DESCRIPTION

Figure 1:
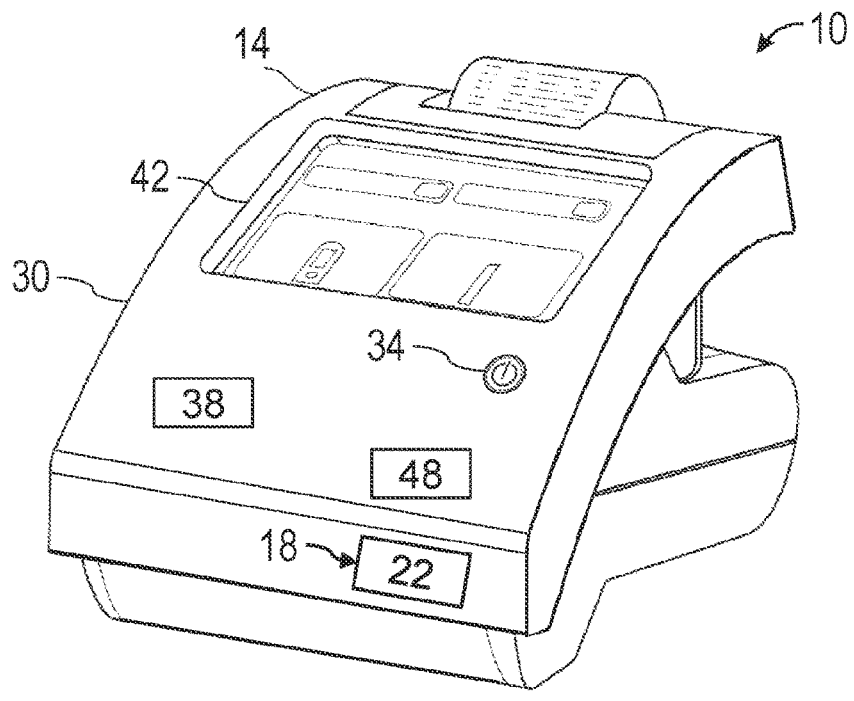
FIG. 1 is a perspective view of an exemplary embodiment of an automated analyzer according to the inventive concepts disclosed herein.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. The inventive concepts disclosed herein are capable of other embodiments or of being practiced or carried out in various ways. Also, it is to be understood that the phraseology and terminology employed herein is for the purpose of description and should not be regarded as limiting the inventive concepts disclosed and claimed herein in any way.

In the following detailed description of embodiments of the inventive concepts, numerous specific details are set forth in order to provide a more thorough understanding of the inventive concepts. However, it will be apparent to one of ordinary skill in the art that the inventive concepts disclosed herein may be practiced without these specific details. In other instances, well-known features have not been described in detail to avoid unnecessarily complicating the instant disclosure.

As used in the description herein, the terms "comprises," "comprising," "includes," "including," "has," "having," or any other variations thereof, are intended to cover a non-exclusive inclusion. For example, unless otherwise noted, a process, method, article, or apparatus that comprises a list of elements is not necessarily limited to only those elements but may also include other elements not expressly listed or inherent to such process, method, article, or apparatus.

Further, unless expressly stated to the contrary, "or" refers to an inclusive and not to an exclusive "or". For example, a condition A or B is satisfied by one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the inventive concept. This description should be read to include one or more, and the singular also includes the plural unless it is obvious that it is meant otherwise. Further, use of the term "plurality" is meant to convey "more than one" unless expressly stated to the contrary.

As used herein, qualifiers like "substantially," "about," "approximately," and combinations and variations thereof, are intended to include not only the exact amount or value that they qualify, but also some slight deviations therefrom, which may be due to computing tolerances, computing error, manufacturing tolerances, measurement error, wear and tear, stresses exerted on various parts, and combinations thereof, for example.

As used herein, any reference to "one embodiment," "an embodiment," "some embodiments," "one example," "for example," or "an example" means that a particular element, feature, structure or characteristic described in connection with the embodiment is included in at least one embodiment and may be used in conjunction with other embodiments. The appearance of the phrase "in some embodiments" or "one example" in various places in the specification is not necessarily all referring to the same embodiment, for example.

The use of ordinal number terminology (i.e., "first", "second", "third", "fourth", etc.) is solely for the purpose of differentiating between two or more items and, unless explicitly stated otherwise, is not meant to imply any sequence or order of importance to one item over another.

The use of the term "at least one" or "one or more" will be understood to include one as well as any quantity more than one. In addition, the use of the phrase "at least one of X, Y, and Z" will be understood to include X alone, Y alone, and Z alone, as well as any combination of X, Y, and Z.

Circuitry, as used herein, may be analog and/or digital components, or one or more suitably programmed processors (e.g., microprocessors) and associated hardware and software, or hardwired logic. Also, "components" may perform one or more functions. The term "component," may include hardware, such as a processor (e.g., microprocessor), an application specific integrated circuit (ASIC), a field programmable gate array (FPGA), a combination of hardware and software, and/or the like. The term "processor" as used herein means a single processor or multiple processors working independently or together to collectively perform a task.

Software may include one or more computer readable instructions that when executed by one or more components cause the component to perform a specified function. It should be understood that the algorithms described herein may be stored on one or more non-transitory computer readable medium. Exemplary non-transitory computer readable mediums may include random access memory, read only memory, flash memory, and/or the like. Such non-transitory computer readable mediums may be electrically based, optically based, magnetically based, and/or the like. Further, the messages described herein may be generated by the components and result in various physical transformations.

As used herein, all numerical values or ranges include fractions of the values and integers within such ranges and fractions of the integers within such ranges unless the context clearly indicates otherwise. Thus, to illustrate, reference to a numerical range, such as 1-10 includes 1, 2, 3, 4, 5, 6, 7, 8, 9, 10, as well as 1.1, 1.2, 1.3, 1.4, 1.5, etc., and so forth. Reference to a range of 1-50 therefore includes 1, 2, 3, 4, 5, 6, 7, 8, 9, 10, 11, 12, 13, 14, 15, 16, 17, 18, 19, 20, etc., up to and including 50, as well as 1.1, 1.2, 1.3, 1.4, 1.5, etc., 2.1, 2.2, 2.3, 2.4, 2.5, etc., and so forth. Reference to a series of ranges includes ranges which combine the values of the boundaries of different ranges within the series. Thus, to illustrate reference to a series of ranges, for example, of 1-10, 10-20, 20-30, 30-40, 40-50, 50-60, 60-75, 75-100, 100-150, 150-200, 200-250, 250-300, 300-400, 400-500, 500-750, 750-1,000, includes ranges of 1-20, 10-50, 50-100, 100-500, and 500-1,000, for example.

Further, as used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

As used herein, a specimen is any sample that is tested by an analyzer system. A specimen may be a sample of body fluid or tissue, such as urine, blood or semen, interstitial fluid, organic chemical compounds, inorganic chemical compounds, any other sample having analytes of interest, or the like, or some combination or constituent thereof. In some embodiments, a specimen is a liquid specimen containing one or more constituents, substances, or properties of interest. The presence and concentrations of these constituents, substances, or properties of interest as determinable by the analyzer system. A specimen may have one or more properties such as color, specific gravity, or the like. A specimen may be a biological specimen, such as blood, semen, interstitial fluid, urine, or any other biological specimen, for example.

Turning now to the drawings and in particular to FIG. 1, shown therein is a perspective view of an exemplary embodiment of an analyzer system 10 according to the inventive concepts disclosed herein. The analyzer system 10 may include an automated analyzer 14 for analyzing a specimen supported by a consumable. The automated analyzer 14 generally includes a sample port 18 operable to receive a consumable support device 22 described in more detail below and shown in FIG. 5. As shown in FIG. 1, the consumable support device 22 is shown in a testing position within the sample port 18. The automated analyzer 14 may further include a housing 30, a power control 34, an input device 38, a user interface device 42, and a control system 46, depicted in FIG. 2 and described in more detail below.

In one embodiment, the housing 30 may be constructed of an opaque material to prevent light from outside the housing 30 from interfering with a reading system. The housing 30 may be constructed from two or more optically opaque component(s) joined together so as to form and support other components of the automated analyzer 14. The housing 30 may also be implemented to house and protect the various components of the automated analyzer 14, and to protect technicians, to protect users, and to protect laboratory work surfaces from contamination, for example.

In one embodiment, the power control 34 may be any user interface device operable to power on/power off or enable/disable the automated analyzer 14.

The automated analyzer 14 may also include an optional waste ramp assembly and/or a waste receptacle (not shown), for example for disposing of one or more consumable.

The user interface device 42 generally provides user feedback. For example, the user interface device 42 may provide one or more instruction to the user regarding a test workflow. In some embodiments, the user interface device 42 may both receive input from the user and provide feedback to the user. The feedback may be visual feedback, auditory feedback, haptic feedback, or the like or some combination thereof. The input may be received by the user interface device 42, such as through a touchscreen.

In some embodiments, the user interface device 42 provides a test menu from which the user can select one or more analysis to be performed on a particular consumable. Further, the user interface device 42 may allow the user to activate one or more action of the automated analyzer 14. For example only and not by way of limitation, the user may indicate to the automated analyzer 14, via the user interface device 42, that a consumable has been placed in the consumable support device 22 at which point the automated analyzer 14 may move the consumable support device 22 within the sample port 19 to the testing position. In some embodiments, and as described in more detail below, the automated analyzer 14 may then perform an analysis on the consumable, provide the user with one or more analysis able to be performed on the consumable via the user interface device 42, ask the user for confirmation of the analysis to be performed, and/or the like, or some combination thereof.

The input device 38 may include one or more device to enable the user to provide an input to the analyzer system 10. For example, the input device 38 may be a button that, when pressed, enables the user to interact with the analyzer system 10 based at least in part on user feedback provided by the user interface device 42.

In some embodiments, the input device 38 may be integrated into the user interface device 42, such as when the user interface device 42 is a touchscreen display. In one embodiment, the power control 34 is integrated into the user interface device 42, such as by enabling the user to make a selection on a touchscreen display to power off/power on the device, or to cause the device to enter into or out of a sleep, hibernation, or power save mode. In one embodiment, the user interface device 42, the input device 38, and the power control 34 may all be integrated into a single device or may be partially integrated into a single device. For example, the power control 34 may be integrated into the user interface device 42 thereby enabling the user to power off/power on the analyzer system 10, however, the analyzer system 10 may include a second power control 34 as a button thereby enabling the user to power off/power on the analyzer system 10 by pressing or interacting with the button.

It should be noted that the power control 34, while referred to and shown as a button, is not limited to a button and may be one or more of a button, toggle, switch, or other device that provides the user the ability to power on/power off the analyzer system 10.

In one embodiment, the sample port 18 provides an opening into the housing 30 through which the consumable support device 22 may enter the automated analyzer 14. The sample port 18 may be sized such that when the consumable support device 22 is in the testing position, the consumable support device 22 is sealed against the housing 30 such that the housing 30 is substantially sealed from light, air, and/or other environmental factors that may enter the housing 30 and contaminate or otherwise compromise the analysis performed on the consumable.

In one embodiment, the analyzer system 10 may further include a reader 48 disposed within and supported by the housing 30. The reader 48 may be positioned adjacent to the consumable support device 22 such that the reader 48 can read one or more consumable or analysis device supported by the consumable support device 22. In one embodiment, the reader 48 includes an image capture system configured to capture one or more image of the one or more consumable or analysis device supported by the consumable support device 22.

Figure 2:
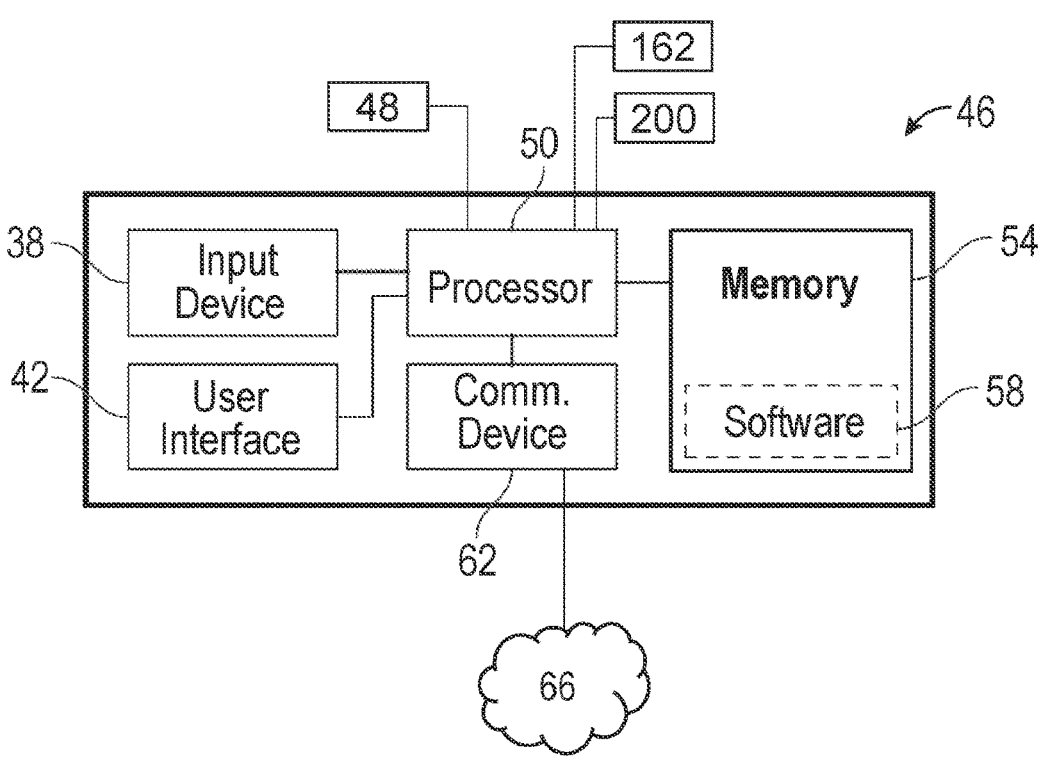
FIG. 2 is a block diagram of an exemplary embodiment of the automated analyzer of FIG. 1.

Referring now to FIG. 2, shown therein is a block diagram of an exemplary embodiment of the control system 46 generally comprising the input device 38 and the user interface device 42 each in communication with a processor 50 operably coupled to a memory 54 storing a software 58, and a communication device 62. The processor 50 may be communicably coupled to an identifier component 162, shown in FIG. 5 and discussed in more detail below, and to the reader 48. In one embodiment, the processor 50, in communication with the reader 48, may cause the reader 48 to read one or more consumable or analysis device as part of an analysis workflow. In one embodiment, the processor 50 is in communication with a key slot 200, described below in more detail and shown in FIG. 7.

In one embodiment, the input device 38 is capable of receiving information input from a user and/or the processor 50, and transmitting such information to other components of the automated analyzer 14. Implementations of the input device 38 may include, but are not limited to, a keyboard, a touchscreen, a mouse, a trackball, a microphone, a fingerprint reader, an infrared port, a slide-out keyboard, a flip-out keyboard, a cell phone, a PDA, a remote control, a fax machine, a wearable communication device, a network interface, a network connected device, combinations thereof, and/or the like, for example.

The user interface device 42 may be capable of outputting information in a form perceivable by the user and/or the processor 50. For example, implementations of the user interface device 42 may include, but are not limited to, a computer monitor, a screen, a touchscreen, a speaker, a website, a television set, a smart phone, a PDA, a cell phone, a fax machine, a printer, a laptop computer, a network interface, a network connected device, combinations thereof, and/or the like, for example. It is to be understood that in some exemplary embodiments, the input device 38 and the user interface device 42 may be implemented as a single device, such as, for example, a touchscreen. It is to be further understood that, as used herein, the term user is not limited to a human being, and may comprise a computer, a server, a website, a processor, a network interface, a human, a user terminal, a virtual computer, combinations thereof, and/or the like, for example.

The processor 50 may be implemented as a single processor or multiple processors working together or independently to execute processor executable code, such as the software 58. Embodiments of the processor 50 may include a digital signal processor (DSP), a central processing unit (CPU), a microprocessor, a multi-core processor, an application specific integrated circuit (ASIC), a field programmable gate array (FPGA), combinations thereof, and/or the like, for example. The processor 50 may be at the same location as the automated analyzer 14, remotely, that is, not at the same location as the automated analyzer 14, or combinations thereof. For example, the processor 50 may be contained within the housing 30, or may be remote in a cloud-based computation service or other remote server, or both contained within the housing 30 and remote in a cloud-based computation service or other remote server.

In one embodiment, the memory 54 is a non-transitory computer readable medium and is implemented as RAM, ROM, flash memory and/or the like, and may take the form of a magnetic device, optical device, electrical device, crystalline device, or any other device operable to store processor executable instructions and information in a non-transitory manner, for example. The memory 54 can be a single non-transitory computer readable memory, or multiple non-transitory computer readable memories functioning logically together or independently, for example.

In one embodiment, the memory 54 includes one or more local non-transitory computer readable memory coupled to one or more remote non-transitory computer readable memory, such as a memory 54 of a cloud-service or other remote server. The memory 54 may store data, such as the software 58, in one or more data structure in the memory 54, for example, a file, a database, or RAW data such as in a partition table or byte access location in the memory 54.

In one embodiment, the memory 54 may store one or more analysis workflow, such as in a database. Each analysis workflow may include an analysis device type and corresponding analysis information such as a duration of an analysis, a speed of an analysis, or user feedback or instruction to assist the user in utilizing the automated analyzer 14 to perform a particular analysis. Each analysis device type may further be associated with a particular consumable insert 100 (described below) having a particular orientation. The particular consumable insert 100 may have multiple orientations. For example, the consumable insert 100 may have 2, 3, 4, 5, 6 or more orientations. For example, the consumable insert 100 may have a cube shape having six faces, each of which is configured to receive a particular type of consumable.

In one embodiment, the software 58 can be stored in the memory 54, read by the processor 50, and executed by the processor 50 to perform each process described herein. The software 58 also includes firmware, may be written in one or more programming language, and is program logic, for example, a set of instructions capable of being executed by the processor 50.

In one embodiment, the communication device 62 is operable to provide communication between the processor 50 and one or more connected device, such as via a network 66. The communication may be either bidirectional or monodirectional. The network 66 may be the internet and the automated analyzer 14 may be interfaced to the one or more connected device via the communication device 62. It should be noted, however, that the network 66 may be almost any type of network and may be implemented as the World Wide Web (or Internet), a local area network (LAN), a wide area network (WAN), a metropolitan network, a wireless network, a cellular network, a Global System for Mobile Communications (GSM) network, a code division multiple access (CDMA) network, a 3G network, a 4G network, a 5G network, a satellite network, a radio network, an optical network, a cable network, an Ethernet network, combinations thereof, and/or the like.

In some embodiments, the communication device 62 provides one or more connection to the one or more other device without connecting to the internet. For example, the network 66 may be a connection between the communication device 62 and a particular device via any digital communications protocol. Non-limiting examples may include, for example, a connection between the communication device 62 of the automated analyzer 14 via a universal serial bus (USB) connection to a computer, a connection between the communication device 62 of the automated analyzer 14 via an optical communications protocol, a connection between the communication device 62 of the automated analyzer 14 and a display device, such as a monitor, and/or the like.

Figure 3:
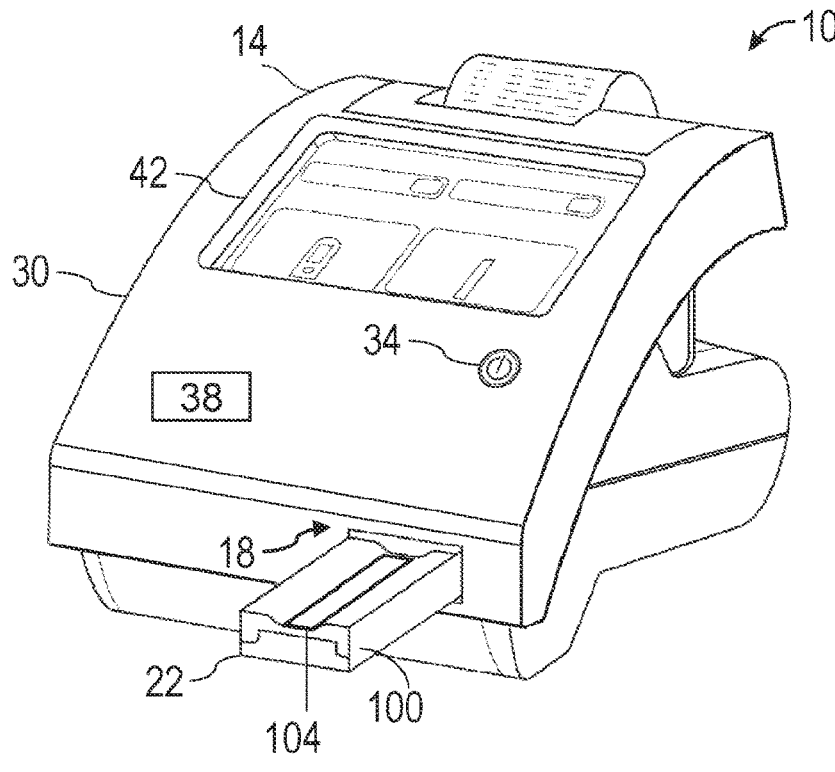
FIG. 3 is a perspective view of an exemplary embodiment of the automated analyzer of FIG. 1 receiving consumable support device having a first consumable insert.
Figure 4:
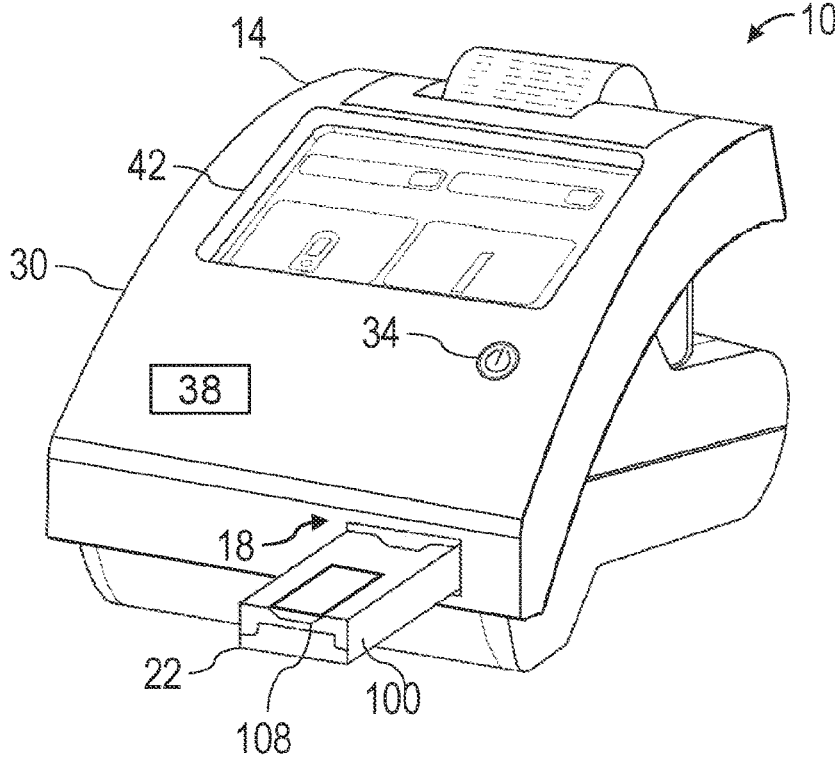
FIG. 4 is a perspective view of an exemplary embodiment of the automated analyzer of FIG. 1 receiving the consumable support device having a second consumable insert.

Referring now to FIG. 3 and FIG. 4, shown therein is a perspective view of an exemplary embodiment of the analyzer system 10 of FIG. 1 constructed in accordance with the present disclosure except the automated analyzer 14 has the consumable support device 22 in a receiving position, different from the testing position, within the sample port 18. As shown in FIG. 3, the consumable support device 22 includes a consumable insert 100 having a first orientation and operable to receive a first consumable 104, such as a test strip. As shown in FIG. 4, the consumable support device 22 includes the consumable insert 100 having a second orientation and operable to receive a second consumable 108, such as a cartridge.

Each of the first consumable 104 and the second consumable 108 has an analysis device type having one or more analysis properties, such as, for example, an analysis type, an analysis speed, and an analysis quantity.

In one embodiment, the first consumable 104 and/or the second consumable 108 has an analysis device type comprising one or more of a reagent test device, a lateral flow immunoassay, a dip-and-read reagent test device, a reagent strip, or the like.

In other embodiments, the first consumable 104 and/or the second consumable 108 may also have an analysis device type of a multiple-profile reagent card having a one or more multiple reagent-impregnated matrix or pad for simultaneously or sequentially performing multiple analyses of analytes. In some embodiments, the first consumable 104 and/or the second consumable 108 have a different analysis device type.

Figure 5:
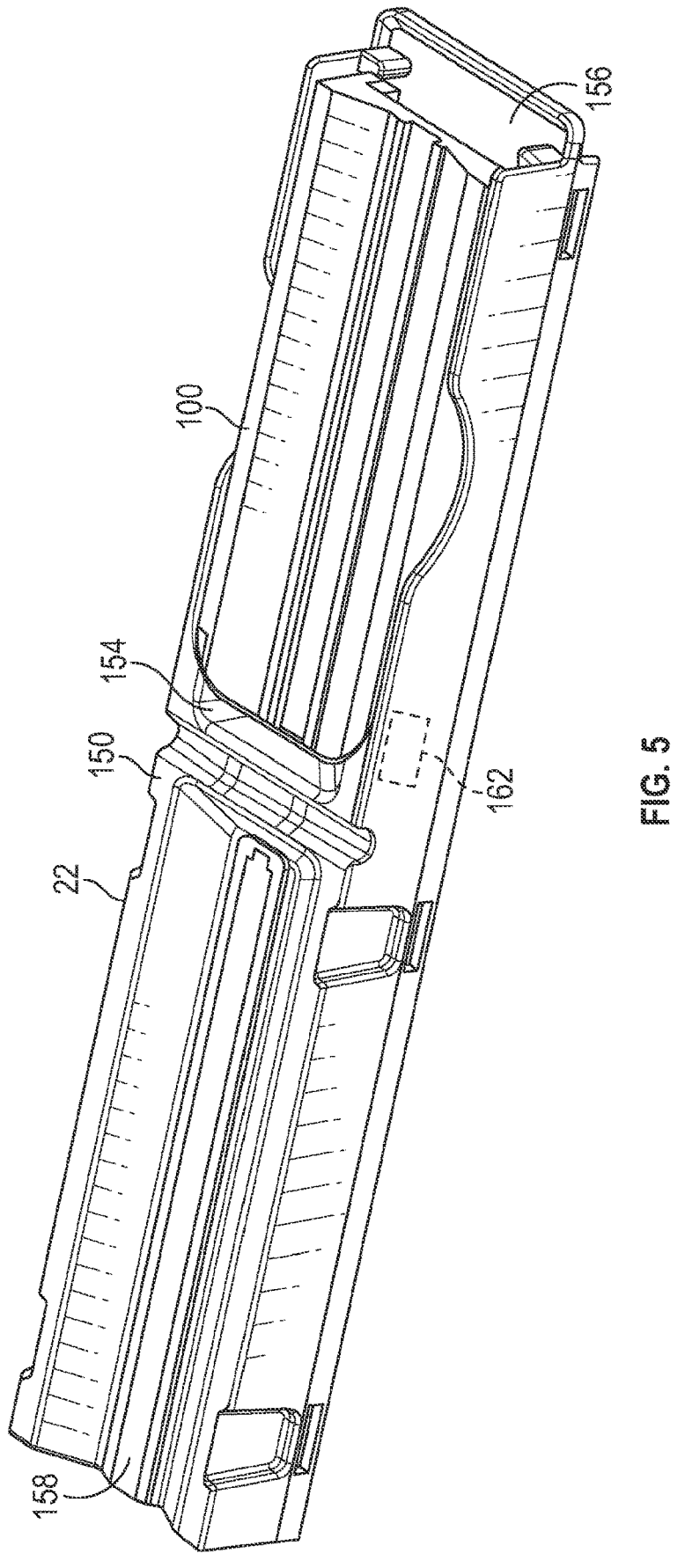
FIG. 5 is a side perspective view of an exemplary embodiment of the consumable support device supporting a consumable insert in a first orientation according to the inventive concepts disclosed herein.

Referring now to FIG. 5, shown therein is a perspective view of an exemplary embodiment of the consumable support device 22 of FIG. 1, FIG. 3 and FIG. 4. The consumable support device 22 generally includes a support housing 150 having an insert portion 154 at least partially surrounding a void 156 sized and dimensioned to receive the consumable insert 100. The insert portion 154 is sized and dimensioned to receive the consumable insert 100. The consumable support device 22 is also provided with a calibration portion 158, operable to assist in calibrating the reader 48. The consumable support device 22 may further include an identifier component 162 (shown in phantom) and positioned adjacent to the insert portion 154.

In one embodiment, the insert portion 154, is configured to enable the consumable insert 100 to be placed within the void 156, as described above.

Figure 6A:
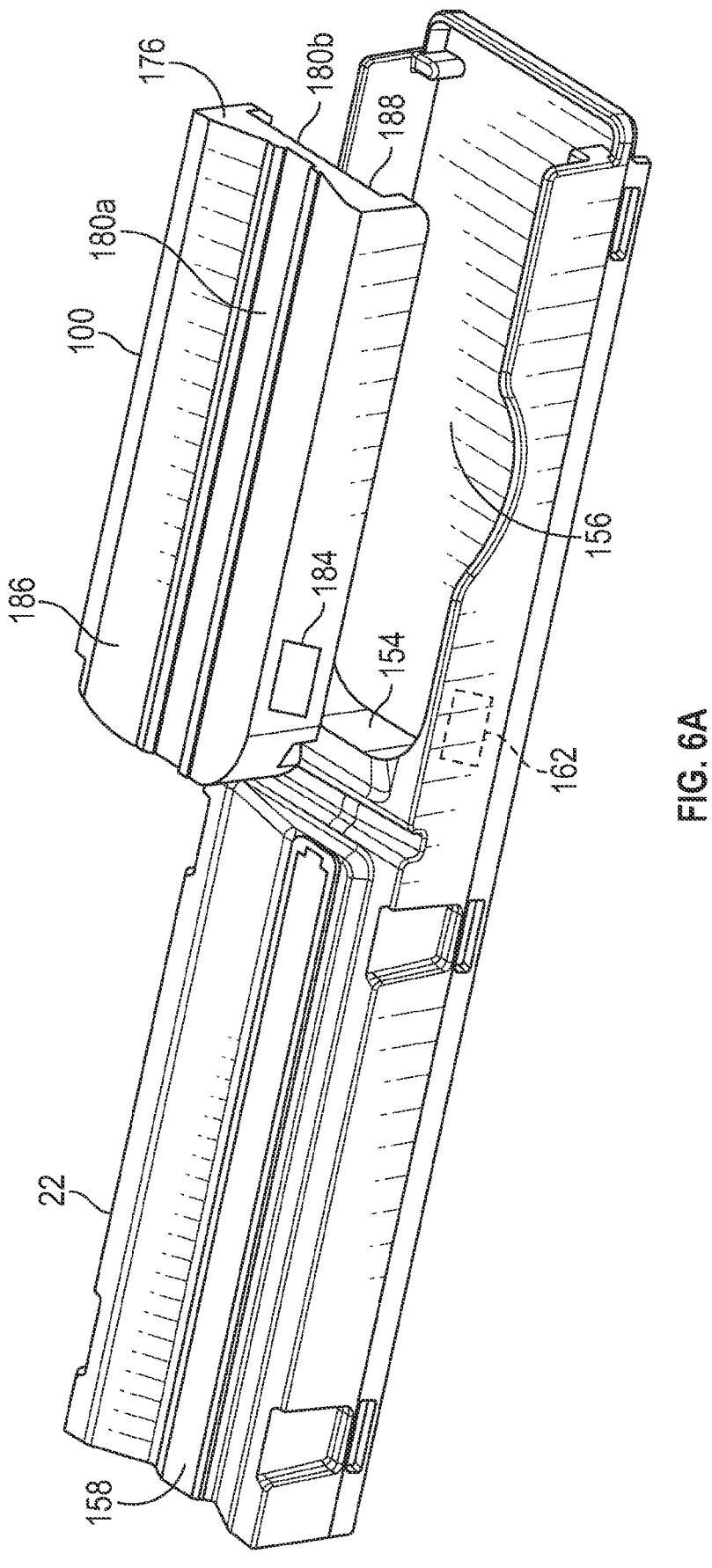
FIG. 6A is an exploded view of the consumable support device and the consumable insert of FIG. 5 according to the inventive concepts disclosed herein.
Figure 6B:
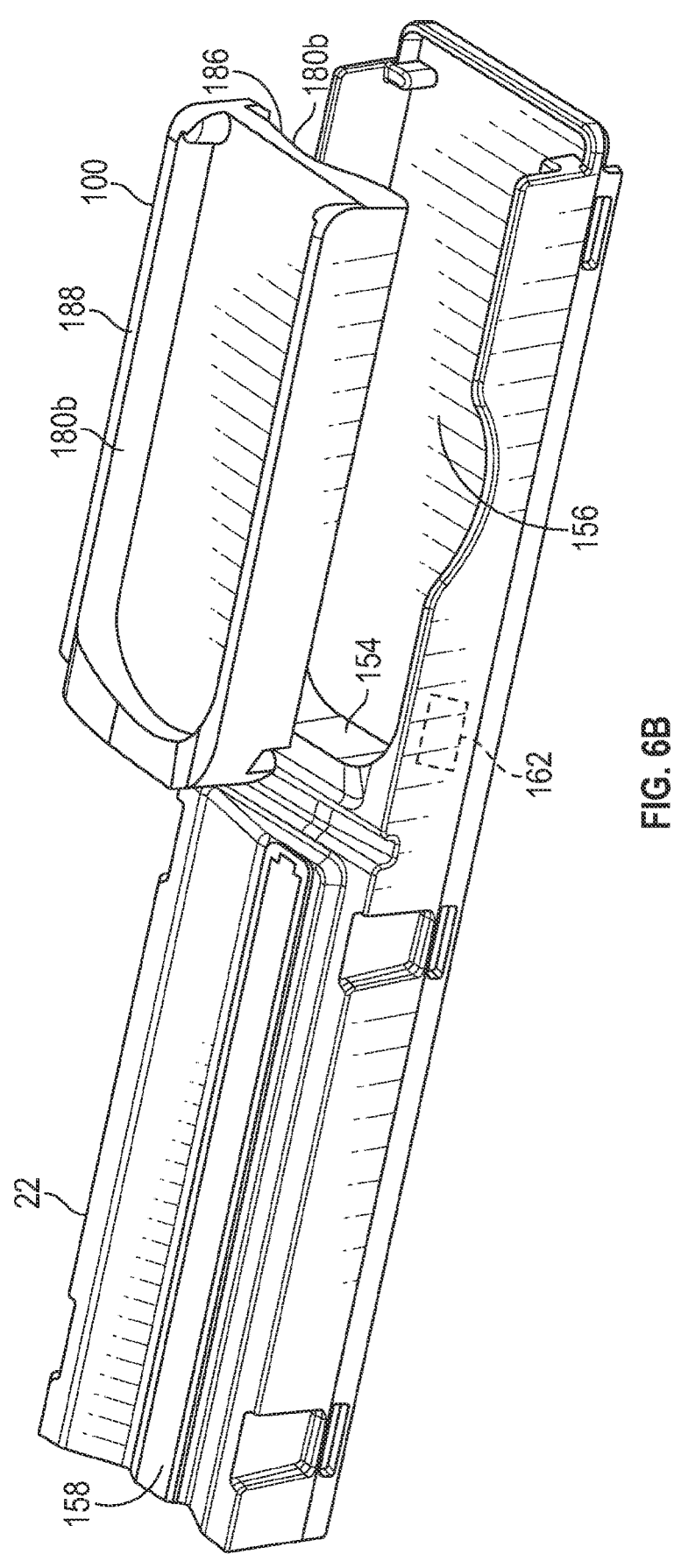
FIG. 6B is a side perspective view of the consumable support device and the consumable insert of FIG. 5 in which the consumable insert is in a second orientation according to the inventive concepts disclosed herein.

Referring now to FIG. 6A, shown therein is an exploded view of the consumable support device 22 and the consumable insert 100 constructed in accordance with the present disclosure. The consumable insert 100 will be described as having a first orientation, however, the consumable insert 100 may have an orientation different from the first orientation, such as a second orientation (as shown in FIG. 6B). The consumable insert 100 generally includes an insert housing 176 having at least one consumable port 180, and an identification component 184. In the example shown, the insert housing 176 has two consumable ports that are identified in FIG. 6A with the reference numerals 180a and 180b. The housing 176 may also have a first side 186 and a second side 188. The second side 188 may be distinct from the first side 186. For example, the second side 188 may be opposite to the first side 186. Each of the consumable ports 180a and 180b may be configured to receive and support one or more consumable. For example, the consumable port 180a may be configured to receive two consumables such as two test strips that have each been exposed to a specimen(s) to be tested.

In one embodiment, the first side 186 of the insert housing is shaped to form the consumable port 180a, and the second side 188 is of the insert housing 176 is shaped to form the consumable port 180b. The consumable port 180a may be configured to receive the first consumable 104 having the first analysis device type, e.g., a test strip. The consumable port 180b may be configured to receive the second consumable 108, e.g., a cassette. In some embodiments, the first consumable 104 and the second consumable 108 have different exterior shapes and/or sizes. In these embodiments, the consumable port 180a will be sized and dimensioned to only receive the first consumable 104 having the first analysis device type, and the portion of the insert housing 176 forming the consumable port 180b will be sized and dimensioned to only receive the second consumable 108. In some embodiments, the second consumable 108, for example, having an analysis device type different from the first analysis device type cannot be supported by the consumable port 180a of the consumable insert 100 in the first orientation.

In one embodiment, the consumable port 180 of the consumable insert 100 is configured to receive an analysis device, e.g., the first consumable 104 or the second consumable 108. In some embodiments, the analysis device, such as the first consumable 104 or the second consumable 108, may extend beyond the insert housing 176. For example, in one embodiment, the analysis device may not be fully within the housing 30 when the consumable support device 22 is in the testing position.

In one embodiment, the identification component 184 may be placed at any location within, on, or otherwise associated with the consumable insert 100. In one embodiment, the identification component 184 may be associated with the consumable insert 100 such that, when the consumable insert 100 is placed within the consumable support device 22, the identification component 182 identifies the orientation of the consumable insert 100 relative to the consumable support device 22. In some embodiments, the orientation of the consumable insert 100 relative to the consumable support device 22 when the consumable insert 100 is placed within the void 156 is correlated to a particular analysis device type.

In one embodiment, the consumable insert 100 includes the identification component 184, as described above. The identification component 184 may be operable to identify the orientation of the consumable insert 100 and identify a consumable insert type. In some embodiments, the identification component 184 interacts with the identifier component 162 to determine the orientation of the consumable insert 100 relative to the consumable support device 22 when the consumable insert 100 is placed within the void 156. Either one of the identifier component 162 or the identification component 184 may determine and/or communicate the consumable insert type and the orientation to the processor 50.

In one embodiment, a second consumable insert having a particular orientation and a second consumable insert type, different from the consumable insert 100, includes a second identification component 184. The processor 50, in communication with the identifier component 162 may detect the second identification component 184, detect the second consumable insert type based in part on the second identification component 184, and determine the particular orientation of the second consumable insert. In some embodiments, the identifier component 162 and/or the second identification component 184 may determine and/or communicate the second consumable insert type and the particular orientation of the second consumable insert to the processor 50. In some embodiments, the particular orientation of the second consumable insert relative to the consumable support device 22 when the second consumable insert is placed within the void 156 of the consumable support device 22 is correlated to a particular analysis device type.

In one embodiment, the identifier component 162 is operable to identify a consumable insert type and detect an orientation of the consumable insert 100, such as the first orientation or the second orientation, based in part on the identification component 184. The identifier component 162 may be placed adjacent to the void 156 to contact the identification component 184 when the consumable insert 100 is in a particular orientation. In this embodiment, the identifier component 162 can detect two orientations of the consumable insert 100, a first orientation when the identification component 184 contacts the identifier component 162, and a second orientation when the identification component 184 does not contact the identifier component 162. The identifier component 162 may be placed at any location within, on, or otherwise associated with the consumable support device 22 such that the identifier component 162 can identify at least the orientation of the consumable insert 100 and/or the consumable insert type.

FIG. 6B shows the consumable insert 100 positioned in a second orientation within the void 156 of the consumable support device 22.

In one embodiment, the identifier component 162 may be placed within the sample port 18 instead of, or in addition to, the consumable support device 22 such that, when the consumable support device 22 is in the testing position, the identifier component 162 can identify the identification component 184 thereby determining the consumable insert type and the orientation of the consumable insert 100. In some embodiments, the identifier component 162 can identify the identification component 184 thereby determining the consumable insert type and/or the orientation of the consumable insert 100 when the consumable support device 22 is in the receiving position.

In one non-limiting embodiment, the identification component 184 associated with the consumable insert 100 is an RFID tag and the identifier component 162 is an RFID reader. When the identifier component 162 is an RFID reader, the identifier component 162 can be supported and/or located on the consumable support device 22, or at another location within the housing 30. In this embodiment, the identification component 184 (e.g, RFID tag) is positioned on the insert housing 176 such that positioning the insert housing 176 into the void 156 of the consumable support device 22 in a known orientation places the identification component 184 within a read range of the identifier component 162, i.e., the RFID reader, and placing the insert housing 176 into the void 156 at another orientation places the identification component 184 outside of the read range of the identifier component 162. In some embodiments the read range may be in a range from 2 millimeters to ½ inch, although other read ranges are possible. The RFID tag may be a passive RFID tag.

Thus, the orientation of the consumable insert 100 can be determined thereby allowing an analysis device having an analysis device type to be inserted into the consumable port 180 of the consumable insert 100 and the consumable insert 100 placed within the consumable support device 22. When the consumable insert 100 having the particular orientation is placed within the void 156 of the consumable support device 22, the processor 50, in communication with the identifier component 162 either reads data or does not read data from the RFID tag, thereby determining the particular orientation of the consumable insert 100. The processor 50 may then access the memory 54 and determine an analysis workflow corresponding to the analysis device type based on the consumable insert type and the determined orientation.

In one non-limiting embodiment, the identification component 184 associated with the consumable insert 100 is an identification circuit and the identifier component 162 is an identifier circuit. In this embodiment, the consumable insert 100 is provided with a particular orientation allowing an analysis device to be inserted into the consumable port 180 of the consumable insert 100 and the consumable insert 100 to be placed within the consumable support device 22. When the consumable insert 100 having the particular orientation is placed within the consumable support device 22, the identification circuit is electrically coupled to the identifier circuit, thereby forming a first circuit. The processor 50, in communication with the identifier component 162, identifies the identification component 184 based in part on the first circuit, for example, by measuring a resistance for the first circuit, thereby determining the consumable insert type and the particular orientation of the consumable insert 100. The processor 50 may then access the memory 54 and determine an analysis workflow corresponding to the analysis device inserted into the consumable port 180 based on at least the consumable insert type and the particular orientation. The consumable insert 100 may be provided with a single identification component 184 that is used to identify one or more particular consumable insert type.

In some embodiments, the consumable insert 100 may be provided with a plurality of identification components 184 with each identification component associated with a particular consumable insert type. For example, the consumable insert 100 may be provided with a first identification component 184 associated with a first orientation and a first consumable insert type, and a second identification component 184 associated with a second orientation and a second consumable insert type. When the consumable insert 100 is placed within the consumable support device 22 in the first orientation, the first identification component 184 can be coupled to the identifier component 162 thereby indicating the first consumable insert type. The identification of the first consumable insert type can be provided to the processor 50 that accesses the memory 54 and determines a first analysis workflow corresponding to the first consumable insert type. When the consumable insert 100 is placed within the consumable support device 22 in the second orientation, the second identification component 184 can be coupled to the identifier component 162 thereby indicating the second consumable insert type. The identification of the second consumable insert type can be provided to the processor 50 that accesses the memory 54 and determines a second analysis workflow, that may be different from the first analysis workflow, corresponding to the second consumable insert type.

In this embodiment, the consumable insert 100 may be provided with a second orientation different from the first orientation, thereby allowing an analysis device to be inserted into the consumable port 180 of the consumable insert 100 and the consumable insert 100 to be placed within the consumable support device 22. When the consumable insert 100 having the second orientation is placed within the consumable support device 22, the identification circuit is electrically coupled to the identifier circuit, thereby forming a second circuit. The processor 50, in communication with the identifier component 162, identifies the identification component 184 based in part on the second circuit, for example, by measuring a second resistance for the second circuit, different from the first circuit, thereby determining the consumable insert type and the second orientation of the consumable insert 100. The processor 50 may then access the memory 54 and determine an analysis workflow corresponding to the consumable insert type having the second orientation.

In one non-limiting embodiment, a first one of the plurality of identification components 184 connected to the insert housing 176 has a first ID code and a second one of the plurality of identification components 184 connected to the insert housing 176 has a second ID code. In this embodiment, the identifier component 162 may be an image capture device, although the identifier component 162 may be another type of device, such as an RFID reader. In this embodiment, the consumable insert 100 is provided with either a first orientation exposing the first ID code to the identifier component 162 or a second orientation exposing the second ID code to the identifier component 162. An analysis device is then inserted into the consumable port 180 of the consumable insert 100 and the consumable insert 100 is placed within the consumable support device 22. When the consumable insert 100 having a particular orientation is placed within the consumable support device 22, the processor 50, in communication with the identifier component 162, e.g., image capture device, captures one or more image of the consumable insert 100 and identifies either the first ID code or the second ID code, thereby determining the consumable insert type and a particular orientation of the consumable insert 100 based on which ID code, either the first ID code or the second ID code, is identified. The processor 50 may then access the memory 54 and determine an analysis workflow corresponding to the consumable insert type having the particular orientation.

In some embodiments, the first ID code and/or the second ID code is any unique identifier that is identifiable by the identifier component 162, and/or the processor 50. For example, the first ID code and/or the second ID code may be printed or embossed, imageable by the image capture device, and identifiable by the processor 50. Each of the first ID code and the second ID code may be one or more of a barcode, a QR code, a matrix barcode, or any other uniquely identifiable code corresponding to the consumable insert type having the particular orientation.

The identification component 184 and the identifier component 162 may be any two components when analyzed together by the processor 50, the processor 50 can determine the consumable insert type and/or the orientation of the consumable insert 100. The identification component 184 and the identifier component 162 are not limited to the embodiments detailed above and may include, for example, the identification component 184 and the identifier component 162 being capacitively coupled, being inductively coupled, or the like.

In one embodiment, the automated analyzer 14, by determining an installed orientation of the consumable insert 100 and/or a consumable insert type of the consumable insert 100, may determine a first analysis workflow to be performed on the first consumable 104. For example, the consumable insert 100 in the first orientation may include at least one identifier identifying a consumable insert type and the first orientation of the consumable insert 100. The processor 50 may access the memory 54 to determine an analysis workflow corresponding to the consumable insert type having the first orientation, for example, by accessing a lookup table, or other data, that correlates the at least one identifier having the consumable insert type and the first orientation to the first analysis workflow specific to the first consumable 104.

Figure 7:
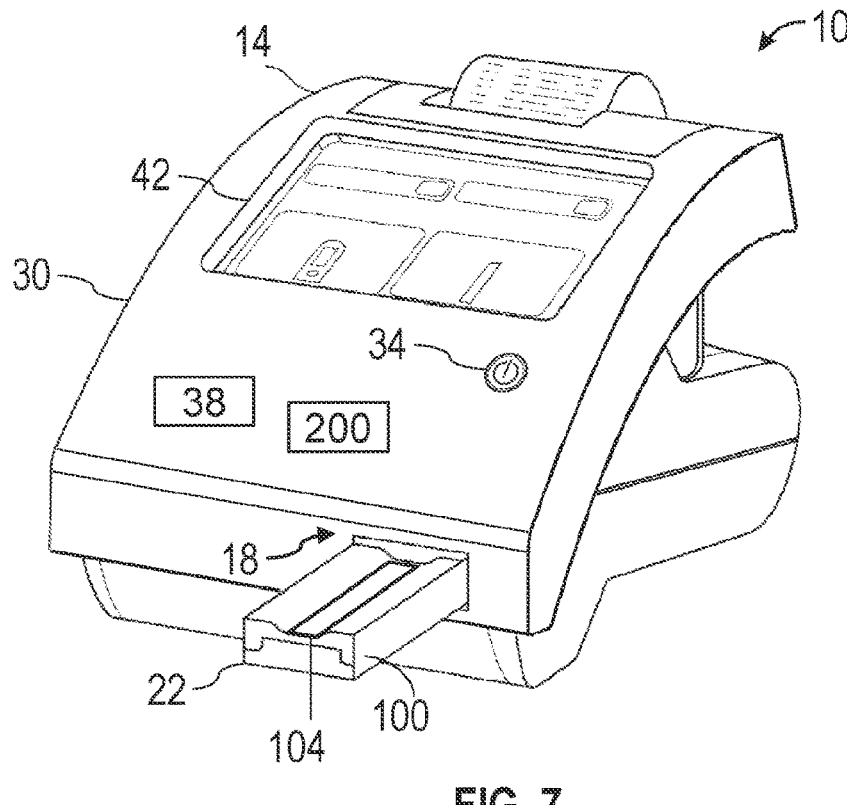
FIG. 7 is a perspective view of an exemplary embodiment of the analyzer system of FIG. 1 constructed in accordance with the present disclosure except the analyzer system further includes a key slot configured to receive an identification key.

Referring now to FIG. 7 shown therein is a perspective view of an exemplary embodiment of the analyzer system 10 of FIG. 1 constructed in accordance with the present disclosure except the automated analyzer 14 further includes a key slot 200 configured to receive an identification key. The key slot 200 can be positioned between the identifier component 162 and the identification component 184 so that the identification key is within the field of view of the identifier component 162. In other embodiments, the key slot 200 can be placed within the housing 200 as shown in FIG. 7. A plurality of identification keys may be provided with each identification key identifying a particular consumable insert type. Once a particular consumable is placed on the consumable support device 22, one of the plurality of identification keys identifying the particular consumable insert type is then placed into the key slot 200. In some embodiments, two or more consumables 108 are provided with the same outer dimensions, but require different analysis workflows to properly read each of these consumables 108. In this instance, an additional discrimination information can be used to uniquely identify the analysis workflow associated with a particular one of the consumables 108. The orientation of the consumable insert 100 and the identification key placed in the key slot 200 can be used to uniquely identify the analysis workflow associated with the consumable 108. The processor 50 reads information from the identification key identifying the particular consumable insert type and then sets the analysis workflow for reading the consumable 108 and/or interpreting information read from the consumable 108.

Figure 8:
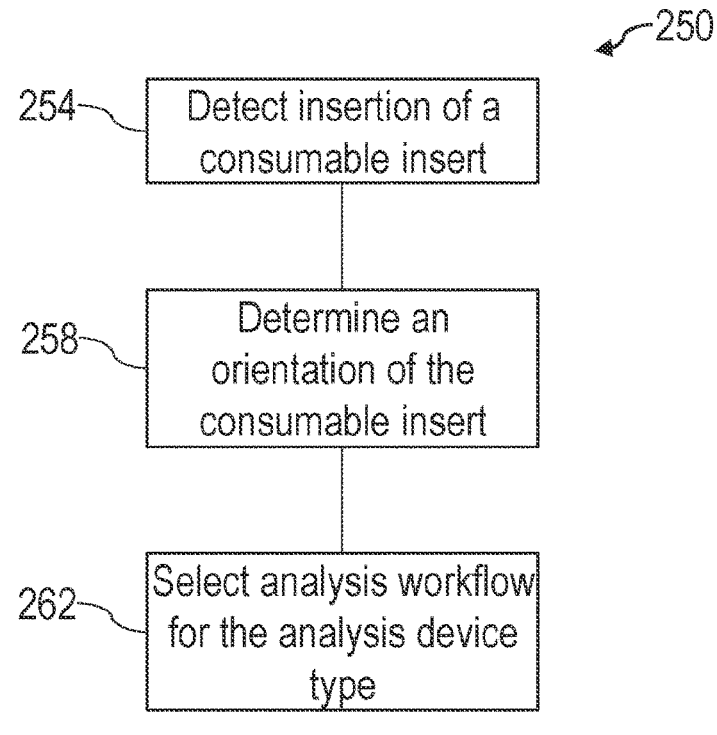
FIG. 8 is an exemplary logic flow diagram of a method for automatically selecting an analysis work flow based upon a determined orientation of a consumable insert in accordance with the present disclosure.

Referring now to FIG. 8, shown therein is an analysis workflow filter process 250 generally comprising: detecting insertion of a consumable insert (step 254); determining an orientation of the consumable insert (step 258); and selecting the analysis workflow for the analysis device type (step 262). The analysis workflow filter process 250 may be implemented as the software 58 and stored in the memory 54 as a set of processor executable instructions or logic, that when executed by the processor 50, cause the processor 50 to carry out the logic to perform the steps as described above.

In one embodiment, detecting insertion of a consumable insert (step 254) may be performed by the processor 50. As described in more detail above, the processor 50 may communicate with the identifier component 162 to identify insertion of the consumable insert 100. In one embodiment, the processor 50 may communicate with the identifier component 162 in response to the consumable support device 22 moving into the testing position. In another embodiment, the processor 50 may communicate with the identifier component 162 in response to one or more input from the user via the user interface device 42 and/or the input device 38.

In one embodiment, determining an orientation of the consumable insert (step 258) may be performed by the processor 50 in response to detecting insertion of the consumable insert 100. The processor 50 determines the orientation of the consumable insert 100 by communicating with the identifier component 162 and causing the identifier component 162 to identify (or not identify) the identification component 184 associated with the consumable insert 100 having a particular orientation.

In one embodiment, selecting the analysis workflow for the analysis device type (step 262) may include accessing, by the processor 50, the memory 54 and selecting one or more analysis workflow associated with the analysis device type for which the consumable port 180 of the consumable insert 100 having the particular orientation is configured based at least in part on the consumable insert 100 and the particular orientation.

In one embodiment, the processor 50 causes the user interface device 42 to display a menu to the user enabling the user to select a particular one of the selected one or more analysis workflow. The menu may display at least each of the one or more analysis workflow.

In one embodiment, the processor 50, in response to a selection of the one or more analysis workflow in the menu, causes the user interface device 42 to indicate to the user the selected workflow. The selected workflow may include one or more user feedback or instruction to assist the user in utilizing the automated analyzer 14 to perform a particular analysis compatible with the analysis device.

In another embodiment, selecting the analysis workflow for the analysis device type (step 262) includes accessing, by the processor 50, the memory 54 and selecting an analysis workflow associated with the analysis device type for which the consumable port 180 of the consumable insert 100 having the particular orientation is configured based at least in part on the consumable insert 100 and the particular orientation. The processor 50, in response to selection of the analysis workflow by the processor 50, causes the user interface device 42 to indicate to the user the selected workflow. The selected workflow may include one or more user feedback or instruction to assist the user in utilizing the automated analyzer 14 to perform a particular analysis compatible with the analysis device.

In one embodiment, indicating to the user the selected workflow may include providing one or more auditory or visual user feedback or instruction to assist the user in utilizing the automated analyzer 14 to perform a particular analysis compatible with the analysis device. The one or more auditory or visual user feedback may include one or more instruction indicating to the user steps needed to complete the particular analysis.

In one embodiment, the selected workflow may further include one or more analysis information used to configure the automated analyzer 14 and enable the automated analyzer 14 to perform the particular analysis required for the analysis device.

It is to be understood that the steps disclosed herein may be performed simultaneously or in any desired order. Further, one or more steps may be further divided into one or more sub steps, and two or more steps or sub-steps may be combined in a single step, for example. Further, in some exemplary embodiments, one or more steps may be repeated one or more times, whether such repetition is carried out sequentially or interspersed by other steps or sub-steps. Additionally, one or more step or sub-steps may be carried out before, after, or between, the steps disclosed herein, for example.

From the above description, it is clear that the inventive concepts disclosed herein are well adapted to carry out the objects and to attain the advantages mentioned herein as well as those inherent in the inventive concepts disclosed herein. While exemplary embodiments of the inventive concepts disclosed herein have been described for purposes of this disclosure, it will be understood that numerous changes may be made which will readily suggest themselves to those skilled in the art and which are accomplished within the scope of the inventive concepts disclosed and as defined in the appended claims.

What is claimed is:

1. An automated analyzer, comprising:

a housing having at least one outer wall that defines an internal cavity therein, the housing having a sample port;

a consumable insert having a consumable insert type and an identification component and shaped and configured to receive a particular type of consumable selected from a group of different types of consumables, each of the consumables being an analysis device having a specimen for analysis;

a consumable support device disposed within the sample port and operable to support the consumable insert and moveable with the consumable insert to a testing position within the internal cavity and a receiving position outside the internal cavity via the sample port, the consumable support device further having an identifier component configured to identify a first consumable insert type or a second consumable insert type based in part on the identification component and configured to output a first data signal indicative of the first consumable insert time or the second consumable insert type;

a reader disposed within the housing and adjacent to the testing position, the reader configured to output a second data signal indicative of a reading from the at least one consumable;

a control system configured to receive the first data signal and the second data signal, and to interpret the second data signal based on the first data signal; and wherein the consumable insert further comprises a first consumable port operable to receive a first consumable when the consumable insert is in a first orientation and having a second consumable port operable to receive a second consumable when the consumable insert is in a second orientation, and wherein the identifier component of the consumable support device is further configured to output the first data signal indicative of the consumable insert type based on either the first orientation or the second orientation.

2. The automated analyzer of claim 1 wherein the consumable support device is configured to receive the consumable insert in a first orientation and a second orientation such that when the consumable insert is received by a void in the first orientation, the identifier component is in communication with the identification component, and when the consumable insert is received in the second orientation, the identifier component is not in communication with the identification component.

3. The automated analyzer of claim 1 wherein the consumable support device is configured to receive the consumable insert in a first orientation and a second orientation such that when the consumable insert is received by the consumable support device in the first orientation, the identifier component is in communication with a first identification component and is configured to output a first signal as the first data signal, and when the consumable insert is received by the consumable insert device in the second orientation, the identifier component is in communication with the a second identification component and is configured to output a second signal as the first data signal, wherein the first signal and the second signal are different.

4. The automated analyzer of claim 1 wherein the identifier component is a first circuit operable to measure an electrical resistance and the identification component is a second circuit operable to generate a first electrical resistance when the consumable insert is in the first orientation and a second electrical resistance when the consumable insert is in the second orientation.

5. The automated analyzer of claim 1 wherein the consumable support device further includes a void configured to receive the consumable insert.

6. The automated analyzer of claim 1 wherein the identifier component is an RFID reader and the identification component is an RFID tag.

7. The automated analyzer of claim 1 wherein the identifier component is an imaging device and the identification component is an ID code.

8. The automated analyzer of claim 1 wherein the identifier component is a first circuit operable to measure an electrical resistance and the identification component is a second circuit operable to generate an electrical resistance.

9. The automated analyzer of claim 1 wherein the identifier component includes a key slot and the identification component is an identification key.

10. A method comprising:
reading an identification component of a consumable insert supported by a consumable support device by an identifier component, the identification component indicative of a first consumable insert type or a second consumable insert type, the consumable insert supporting a consumable being an analysis device having a specimen for analysis in a testing position within a housing of an analyzer,
outputting a first data signal indicative of the consumable insert type being one of the first consumable insert type and the second consumable insert type; and
selecting a first analysis workflow based on the first data signal indicating the first consumable insert type and a second analysis workflow based on the first data signal indicating the second consumable type, the first analysis workflow being different from the second analysis workflow.

11. The method of claim 10 wherein reading the identification component indicates the consumable insert is in a particular orientation.

12. The method of claim 11 wherein selecting the analysis workflow further includes selecting the analysis workflow based on the particular orientation of the consumable insert.

13. The method of claim 10 further comprising executing the first analysis workflow or second analysis workflow to analyze a specimen within a consumable supported by the consumable insert.

14. A method of using an automated analyzer comprising:
inserting a consumable into a consumable port of a consumable insert, the consumable being an analysis device having a specimen for analysis and having a consumable type, and the consumable insert supporting the consumable;
placing the consumable insert with a particular orientation selected from a first orientation and a second orientation into a consumable support device to indicate a particular consumable type; and
initiating an analysis workflow for the consumable to cause the automated analyzer to move the consumable support device, the consumable insert and the consumable to a testing position into a housing and analyze the specimen without requiring manual selection of the analysis workflow.

15. An automated analyzer, comprising:
a housing having at least one outer wall that defines an internal cavity therein, the housing having a sample port;
a consumable insert having a consumable insert type and an identification component and shaped and configured to receive a particular type of consumable selected from a group of different types of consumables, each of the consumables being an analysis device having a specimen for analysis;
a consumable support device disposed within the sample port and operable to support the consumable insert and moveable with the consumable insert to a testing position within the internal cavity and a receiving position outside the internal cavity via the sample port, the consumable support device further having an identifier component configured to identify the consumable insert type based in part on the identification component and configured to output a first data signal indicative of the consumable insert type;
a reader disposed within the housing and adjacent to the testing position, the reader configured to output a second data signal indicative of a reading from the at least one consumable; and
a control system having a processor and a non-transitory computer readable medium storing computer executable instructions that when executed by the processor causes the processor to:
receive the first data signal indicative of the consumable insert type;
retrieve an analysis workflow corresponding with the consumable insert type from a database storing a plurality of analysis workflows;
execute the analysis workflow;
receive the second data signal from the reader; and
interpret the second data signal based on the executed analysis workflow.

16. The automated analyzer of claim 15 wherein:
the consumable insert further comprises a first consumable port operable to receive a first consumable when the consumable insert is in a first orientation and having a second consumable port operable to receive a second consumable when the consumable insert is in a second orientation;
the identifier component of the consumable support device is further configured to output the first data signal indicative of the first orientation or the second orientation as a particular orientation; and
the non-transitory computer readable medium storing further computer executable instructions that when executed by the processor causes the processor to: receive the first data signal indicative of the particular orientation; retrieve the analysis workflow corresponding with the consumable insert type having the particular orientation from a database storing a plurality of analysis workflows, the analysis workflow being provided for the first consumable when the first data signal is indicative of the particular orientation being the first orientation and for the second consumable when the first data signal is indicative of the particular orientation being the second orientation.

17. The automated analyzer of claim 16 wherein the identifier component includes a key slot and the identification component is an identification key.

* * * * *